Nov. 12, 1968     K. R. FISHER     3,409,965

TIPPED BALL END CUTTER

Filed June 7, 1966

INVENTOR.
Kenneth R. Fisher.

BY
Barnes, Dickey & Pierce
ATTORNEYS ns patent office 3,409,965
Patented Nov. 12, 1968

3,409,965
TIPPED BALL END CUTTER
Kenneth R. Fisher, Grosse Pointe Woods, Mich., assignor to Universal American Corporation, New York, N.Y., a corporation of Delaware
Filed June 7, 1966, Ser. No. 555,736
9 Claims. (Cl. 29—103)

ABSTRACT OF THE DISCLOSURE

A tipped cutting tool has a cylindrical body and a ball end provided with diametrical slots in the side joined by a slot across the end. A strip of cutting material is formed into U-shape and brazed in the slot to form cutting edges at opposite sides and across the end of the body.

---

This invention relates to ball end cutters and particularly to a ball end cutter having inlays of hard cutting material.

The present invention pertains to the formation of a body for a ball end cutter having slots along each of four sides with one pair of slots extending over the ball end. Strips of carbide or other hard material are brazed or otherwise secured with the slots. In the arrangement herein illustrated, one strip is continuous being formed in U-shape, the legs are formed in a helix to follow the helix of slow lead of the slots. The edge of the strips are relieved in the opposite direction from the center across the top of the ball end and along the sides thereof. Similar strips which terminate before reaching the center of the ball end are likewise helical shaped the same as the legs of the U-shaped strip and disposed in recesses provided along the side of the body intermediate that for the legs of a U-shaped strip. This provides four cutting edges along the side and one across the top the latter being relieved to provide chip clearance facing in opposite directions on opposite sides of the ball end center. This permits the end to function as a drill to machine a hole to depth after the tool and work are moved relative to each other to form a slot or to machine a recessed area of desired shape.

Accordingly, the main objects of the invention are: to provide a ball end cutter with an insert of hard material formed from a strap into a U-shape and secured in all-shaped recesses in the ball end body of the cutter, to embed a U-shaped strip in the body of a cutter with legs extending on opposite sides thereof and providing additional strips which are embedded in the body interjacent of the ends which terminate short of the center of the ball ends of the cutter; to form a ball headed cutter from a body having a rounded end and spherical body which contains recesses for form strips of hard metal the one of U-shape to extend over the ends of the ball end of a cutter with the legs embedded in the cylindrical side with additional length portions interjacent the length portions of the U-shape strip and in general to afford a ball end cutter with hard inserts which are simple in construction, positive in operation, and economical to manufacture.

Other objects and features and novelty of the invention will be specifically pointed out and will become apparent when referring, for a better understanding of the invention, to the following description taken in conjunction with the accompanying drawing, wherein.

Figure 1:
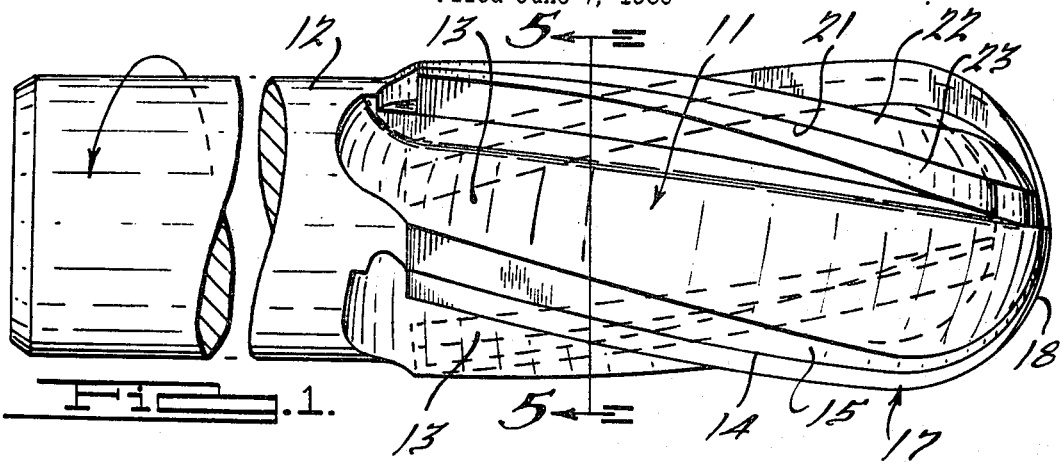
FIG. 1 is a broken view in the side elevation of a ball end cutter embodying features of the present invention.
Figure 2:
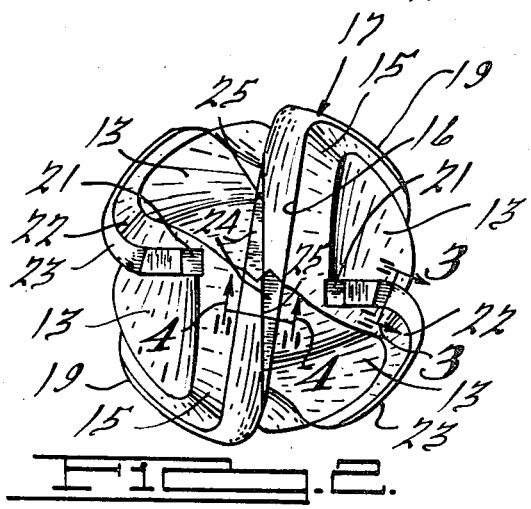
FIG. 2 is an end view of the structure illustrated in FIG. 1.
Figure 3:
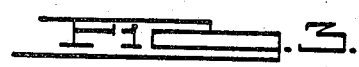
FIG. 3 is a sectional view of the structure illustrated in FIG. 2, taken on the line 3—3 thereof.
Figure 4:
FIG. 4 is an enlarged sectional view of the structure illustrated in FIG. 2, taken on the line 4—4 thereof.
Figure 4:
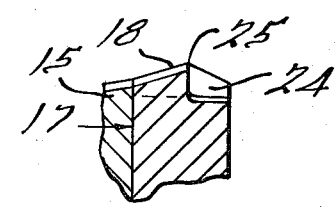
Figure 4:
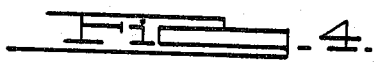
Figure 6:
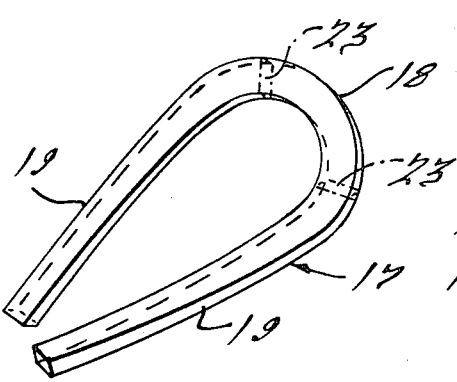
FIG. 6 is a view of the U-shaped insert secured before being secured in a slot in the body of the cutter.

The cutter of the present invention has a body 11 and a driving shank 12, the body having helical shaped slots 13 which function as flutes disposed forwardly of the cutting edges. A helical recess 14 of slow lead is provided in diametrically disposed lands 15 of the body 11 which pass across the ball end of the body at 16. A strip of tungsten carbide or like hard material 17 is bent to U-shape as illustrated in FIG. 6, having a U-shaped end portion 18 and a pair of legs 19 which are twisted into helical form to follow the slow lead of the helical form of the recess 14. The hard U-shaped element 17 is disposed within the recess 14 along with brazing material which secures the element 17 to the lands 15.

Figure 5:
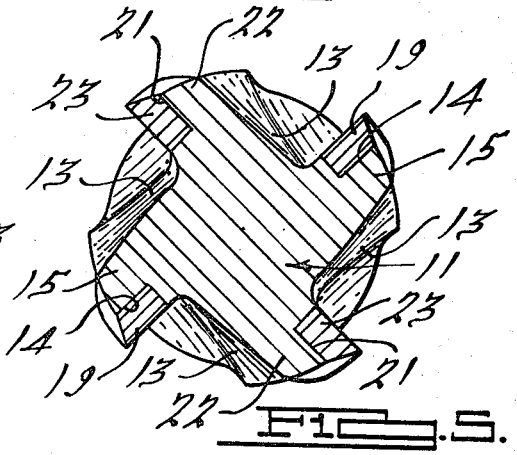
FIG. 5 is a sectional view of the structure illustrated in FIG. 1, taken on the line 5—5 thereof.

Additional helical recesses 21 are provided in diametrically disposed helical lands 22 of the body which are positioned midway between the lands 15. Similar leg portions 23 of a length indicated by the dot and dash lines of the structure illustrated in FIG. 6, are placed within the recesses 21 along with brazing material which secures the elements 23 to the lands 22. When the body is heated in the furnace, the brazing material in the slots 14 and 21 will melt and will when cooled securely bind the end portion 18 and the legs 19 of the strip 17 in the recess 14 and the leg portions 23 in the recesses 21, as illustrated in FIG. 5. The leg portions 19 and 23 and the arcuate end portion 18 are backed off along with the material of the lands 15 and 22 to provide relief to the cutting edges at the forward edge of the hard strips. Areas 24 are cut downwardly from cutting edges 25 on the U-shaped end portion 18 to provide chip clearance and a positive cutting angle to the cutting edges 25.

By the use of the formed strips of hard material for the legs and for the arcuate end of the ball end cutter, a simple method is provided for producing a ball end cutter having long life and sharp cutting edges. The cutting edges are not only provided along the sides but also across the ball end of the cutter body. By shaping the body to have flutes and recessed areas for the strips, the brazing of the strips within the recessed areas produces a solid tool with hardened cutting edges. The tool produces rapid cutting both for sinking the tool to a depth and for relatively moving the tool and work laterally to produce a slot or to enlarge the area initially cut. The substantial width provided to the hardened inserts permits a large number of dressing operations to be performed on the profile of the teeth to maintain sharp cutting edges without affecting the longevity of the tool.

What is claimed is:

1. In a tipped cutting tool, a body having a recess along opposite sides and across the end thereof forming chip receiving flutes, one wall of the flutes having a notch therealong, and a strip of hard material formed into U-shape to have an end web and two side extensions which are received in said notch, and a brazing material securing said formed strip in said notch to provide hard cutting edges along opposite sides and across the end of the tool body.

2. In a tipped tool as recited in claim 1 wherein the end of the tool and the web of the strip is of arcuate shape to form a ball end on the cutter body.

3. In a tipped tool as recited in claim 2 wherein said flutes are provided forwardly of the strip and relief is provided on the edge of the strip rearwardly of the flutes to form cutting edges.

4. In a tipped tool as recited in claim 3, wherein the arcuate end portion of the strip is recessed in opposite directions on each side of the center line to provide chip-receiving areas below the cutting edges.

5. In a tipped tool as recited in claim 4 wherein additional recesses forming flutes are provided in the sides of the tool body intermediate the first said recesses, the wall of said additional recesses having a notch therein, and a pair of strips of hard material secured in said recesses in spaced relation to said U-shape strip.

6. A tipped tool as recited in claim 5 wherein said flutes are disposed forwardly of the pair of strips and have their edges relieved rearwardly of the flutes.

7. In a tipped tool as recited in claim 6 wherein the additional recesses and the strips secured therein are of helical form disposed on a slow lead.

8. In a tipped tool as recited in claim 1 wherein the body is provided with four flutes which are recessed and provided with one strip formed in U-shape and disposed in diametrical recesses and a pair of formed strips disposed in the recesses therebetween, the arcuate end portion of the one strip being recessed to provide chip clearance for the cutting edges which face in opposite directions each side of the center line.

9. In a tipped tool as recited in claim 1, wherein the side recesses and the side extensions of the strip are of helical form disposed on a slow lead.

References Cited

UNITED STATES PATENTS 706,013   8/1902   Boyce _____ 29—103 X
2,621,548  12/1952  Williams _____ 77—58

FOREIGN PATENTS 555,440   7/1932   Germany.

HARRISON L. HINSON, *Primary Examiner.*